United States Patent [19]
Kloots

[11] Patent Number: 5,617,302
[45] Date of Patent: Apr. 1, 1997

[54] ROTARY MULTIPLE PORT TURRET MECHANISM FOR A FIBEROPTIC ILLUMINATOR

[75] Inventor: Jacobus F. Kloots, Naples, Fla.

[73] Assignee: Pilling Weck Incorporated, Research Triangle Park, N.C.

[21] Appl. No.: 384,927

[22] Filed: Feb. 7, 1995

[51] Int. Cl.⁶ .................................................. F21V 7/04
[52] U.S. Cl. .............................................. 362/32; 362/294
[58] Field of Search .............................. 362/294, 26, 27, 362/32, 282; 385/25, 26

[56] References Cited

U.S. PATENT DOCUMENTS

| | | | |
|---|---|---|---|
| 4,025,776 | 5/1977 | Cawood et al. | 362/32 |
| 4,773,723 | 9/1988 | Cuda | 362/32 X |
| 4,786,127 | 11/1988 | Molnar | 362/32 X |

Primary Examiner—Stephen F. Husar
Attorney, Agent, or Firm—William E. Noonan

[57] ABSTRACT

A multiple port turret mechanism is disclosed for operably interconnecting a fiberoptic illuminator and a selected one of a like multiple standard fiberoptic cables, each having a distinct respective end fitting. The turret mechanism includes a turret body having a plurality of distinctly shaped ports formed therethrough. Each port is adapted for selective and operable interengagement with the end fitting of a corresponding one of the fiberoptic cables. At least one of the ports includes a pair of receptacles for interengaging either a single or a double plug end fitting of a respective fiberoptic cable. The turret is mounted for indexed rotation such that a selected port is held in position in front of the aperture and light from the illuminator is directed through the corresponding fiberoptic cable engaged with the selected port.

20 Claims, 7 Drawing Sheets

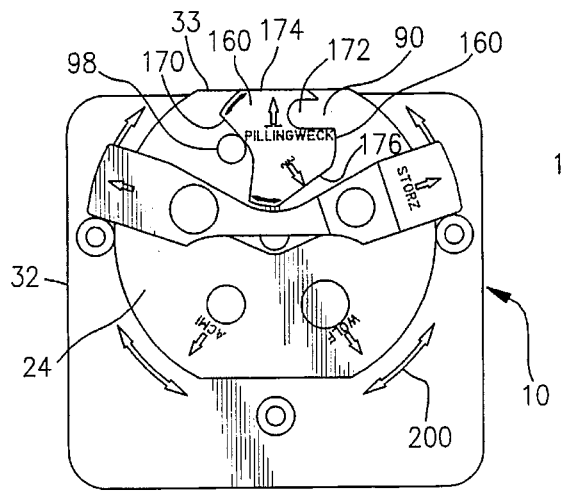
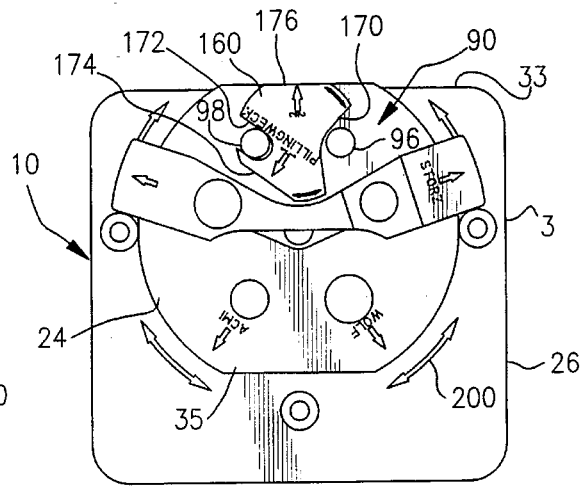
FIG. 8    FIG. 9
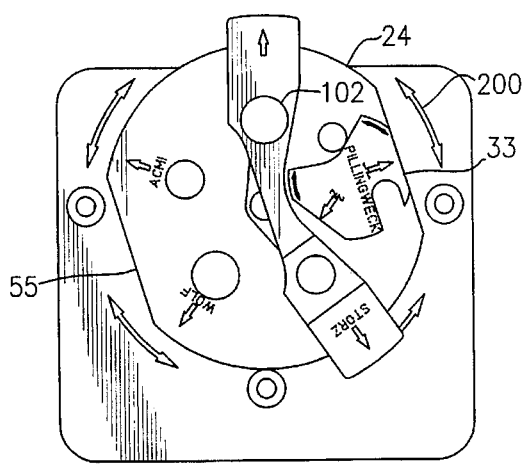
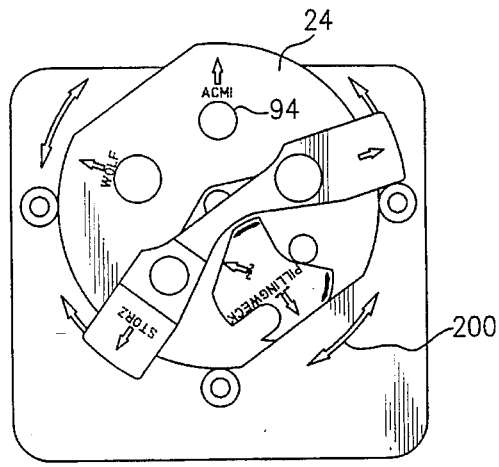
FIG. 10    FIG. 11
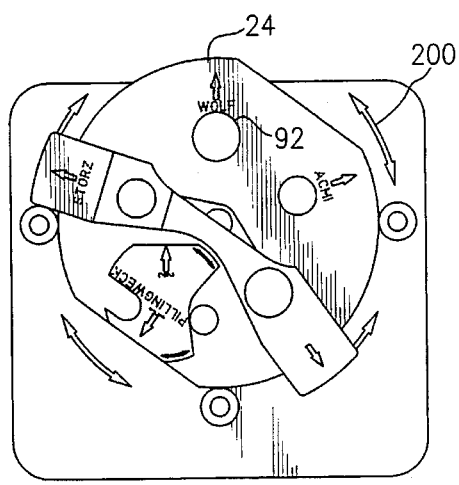
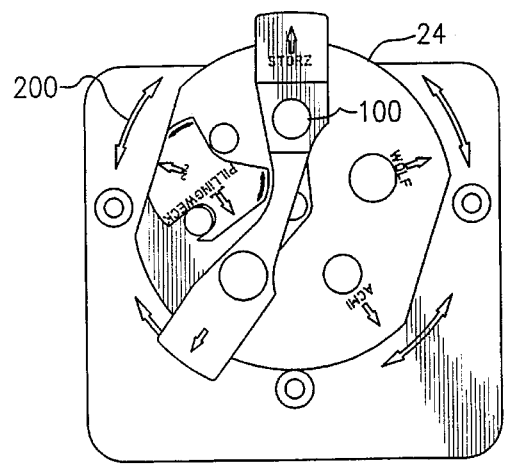
FIG. 12    FIG. 13

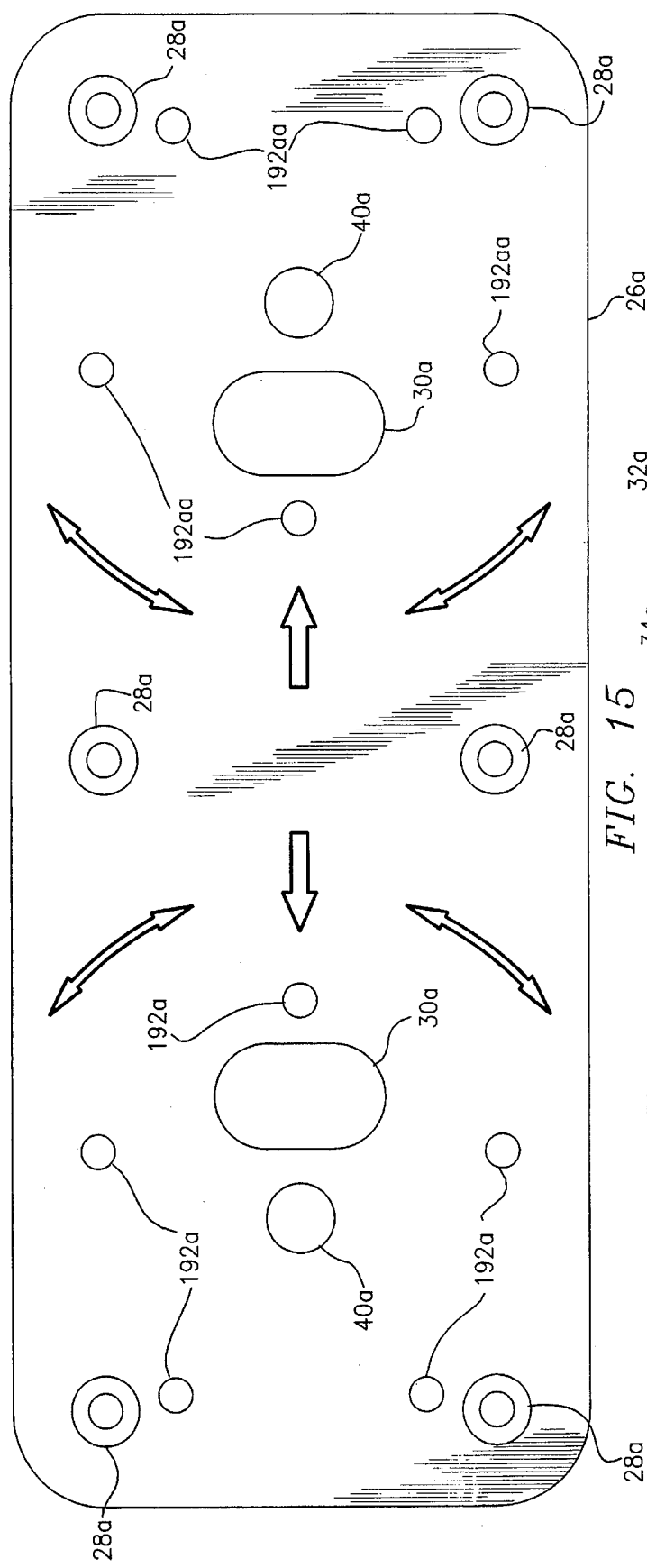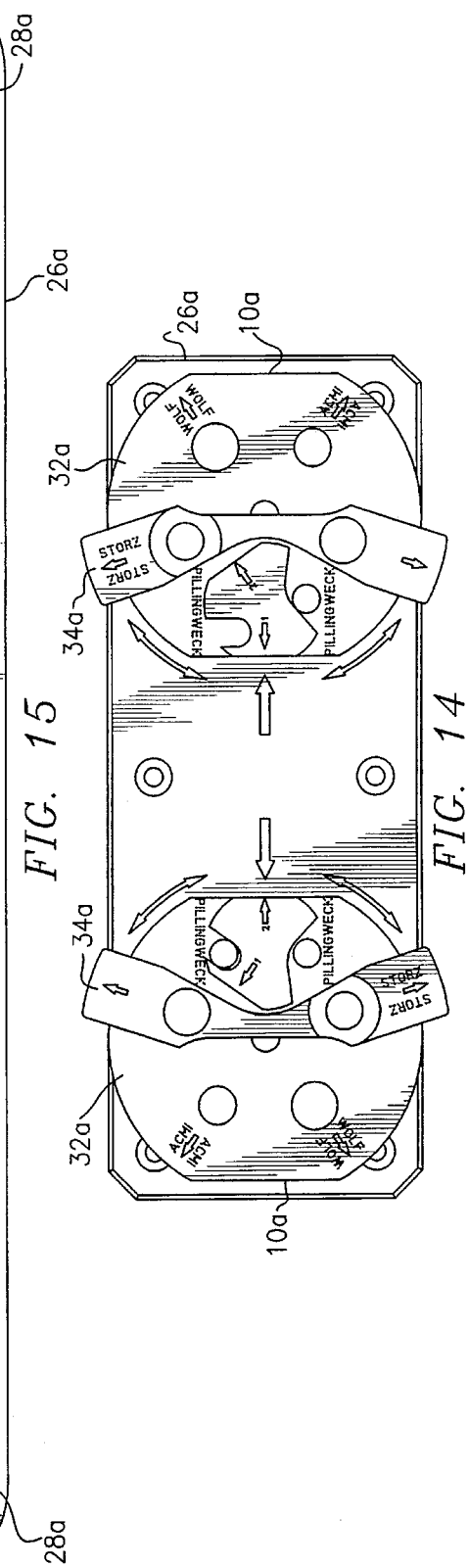

ROTARY MULTIPLE PORT TURRET MECHANISM FOR A FIBEROPTIC ILLUMINATOR

FIELD OF THE INVENTION

This invention relates to a multiple port turret mechanism for a fiberoptic illuminator and, more particularly, to a rotary multiple port turret mechanism which operably interconnects the illuminator and a selected one of a number of standard fiberoptic cables.

BACKGROUND OF THE INVENTION

Fiberoptic illuminators have been used in a variety of surgical applications. For example, relatively intense xenon illuminators are widely employed for endoscopic and laparoscopic procedures. Where less intense lighting is required, halogen illuminators are utilized. Such devices provide necessary lighting for surgical headlamps.

Traditionally, each manufacturer's illuminator has been adapted to receive only that manufacturer's brand of fiberoptic cable. Most illuminators are unable to accept cables produced by competitors. As a result, hospitals and clinics have often been limited to using illuminators and cables manufactured by the same company. Replacement cables from another company cannot be used unless a corresponding illuminator is on hand. This can present an expensive and inefficient dilemma for the institution.

Conventional fiberoptic illuminators exhibit a number of problems in addition to the lack of interchangeable parts. For example, the jack or port that accepts the fitting of the fiberoptic cable is typically located close to the internal lamp or light source. As a result, the area surrounding the port tends to become very hot and difficult, if not impossible to handle. Standard illuminator ports or turrets have also been limited to accepting fiberoptic cables that have single plug end fittings. To date, no illuminator has been capable of selectively accepting either a single plug or a double plug end fitting in the same port. Lack of secure interengagement between the fiberoptic end fitting and the illuminator has also been a problem. During use the cable has a tendency to become loose from the illuminator. This can disrupt the medical or surgical procedure for which the illuminator is being used. Moreover, conventional turrets are often difficult to rotate and require varying degrees of torque. As a result, indexing cannot be performed in an optimally smooth, quick and convenient manner.

SUMMARY OF INVENTION

It is therefore an object of the present invention to provide an improved multiple port turret mechanism which provides for secure interengagement of a fiberoptic illuminator and a selected one of a number of standard fiberoptic cables.

It is a further object of this invention to provide a multiple port turret mechanism that permits any one of at least five varieties of fiberoptic cable to be selectively connected to a fiberoptic illuminator so that efficiency is improved and expense is reduced.

It is a further object of this invention to provide a multiple port turret mechanism that achieves improved, secure interengagement between the illuminator and the fiberoptic cable and which resists unintentional disengagement of those parts.

It is a further object of this invention to provide a multiple port turret mechanism that exhibits improved indexing rotation and which locks a selected port securely in place in front of the illuminator light source.

It is a further object of this invention to provide a multiple port turret mechanism for fiberoptic illuminators, which includes a port that selectively accepts either a single or a double plug end fitting.

It is a further object of this invention to provide a multiple port turret mechanism for fiberoptic illuminators, which exhibits improved heat dissipation and is safe for operator handling.

It is a further object of this invention to provide a multiple port turret mechanism that is suitable for use on virtually all fiberoptic illuminators, including both xenon and halogen illuminators.

This invention features a multiple port turret mechanism for operably interconnecting, a fiberoptic illuminator, which illuminator includes a light source and a housing that encloses the light source, and a selected one of a like multiple of standard fiberoptic cables, each cable having a respective end fitting that is different from the end fitting of each other cable. The turret mechanism includes a plate element mounted to the housing, and including means defining an aperture for projecting light from the light source. There is a turret body that includes a base portion having a first group of at least three port means formed therethrough. Each port means in the first group is adapted for selective and operable interengagement with the end fitting of a corresponding one of the fiberoptic cables. There is an elongate tower portion attached to and extending upwardly from the base portion and having a second group of at least two port means formed longitudinally therethrough. Each port means of the second group is adapted for selectively and operably interengaging the end fitting of a corresponding one of the fiberoptic cables. There are means for mounting the turret body to the housing such that the port means are permitted to pass individually in front of the aperture. Index means are provided for controlling rotation of the body and holding a selected one of the port means in position in front of the aperture such that light from the illuminator is directed through a corresponding fiberoptic cable engaged with the selected port means.

In a preferred embodiment, one of the standard fiberoptic cables includes either a first end fitting having a single plug element or a second end fitting having two plug elements. In such cases, the turret body includes primary port means that have a first receptacle for selectively receiving the plug element of the first end fitting and one of the plug elements of the second end fitting and a second receptacle for receiving the other plug element of the second end fitting to operably interengage a selective one of the first and second end fittings and a corresponding fiberoptic cable with the primary port means. The primary port means are preferably formed through the typically disk-shaped base of the turret body.

The port means may be arranged at different angular orientations about the turret body. The tower portion may include a plurality of cooling fins that extend generally parallel to the base portion.

Resilient bearing means may be carried by the turret body for bearing against an end fitting engaged with a corresponding port means such that the engaged end fitting resists disengagement from the corresponding port means. The resilient bearing means may include spring means received in a groove in the tower portion adjacent to one of the port means in the second group and bearing means biased by the spring means into interengagement with the corresponding end fitting engaged with the adjacent port means. The resilient bearing means may also include a spring clip mounted in the base portion and extending into the corresponding port means in the first group for engaging and holding an end fitting that is engaged with the corresponding port means.

The first and second receptacles may extend generally downwardly through the base portion at a converging angle. Preferably, a closure member is movably mounted to the body portion and alternated between a first position wherein the closure member covers the second receptacle and exposes the first receptacle for interengagement with the plug element of the first end fitting and a second position wherein the closure element exposes both the first and second receptacles for respective interengagement with the plug elements of the second end fitting.

The means for indexing preferably include five spherical bearings that are accommodated in respective orifices in the base of the turret body. Respective indexing springs urge the bearings outwardly to engaged respective position defining holes formed in the plate.

DETAILED DESCRIPTION OF PREFERRED EMBODIMENTS

Other objects, features and advantages will occur from the following description of preferred embodiments and the accompanying drawings, in which:

FIGS. 8–13 are elevational, axial end views of the turret mechanism in its respective indexed positions. In each position, a selected port means is held in front of the illuminator aperture.

FIG. 14 is a plan view of an alternative mounting plate used with a halogen illuminator; and FIG. 15 is an elevational, axial end view of a pair of turret mechanisms, according to this invention, mounted to the plate of FIG. 14. In the respective turret mechanisms, one and two receptacles of the primary port means are exposed.

Figure 1:
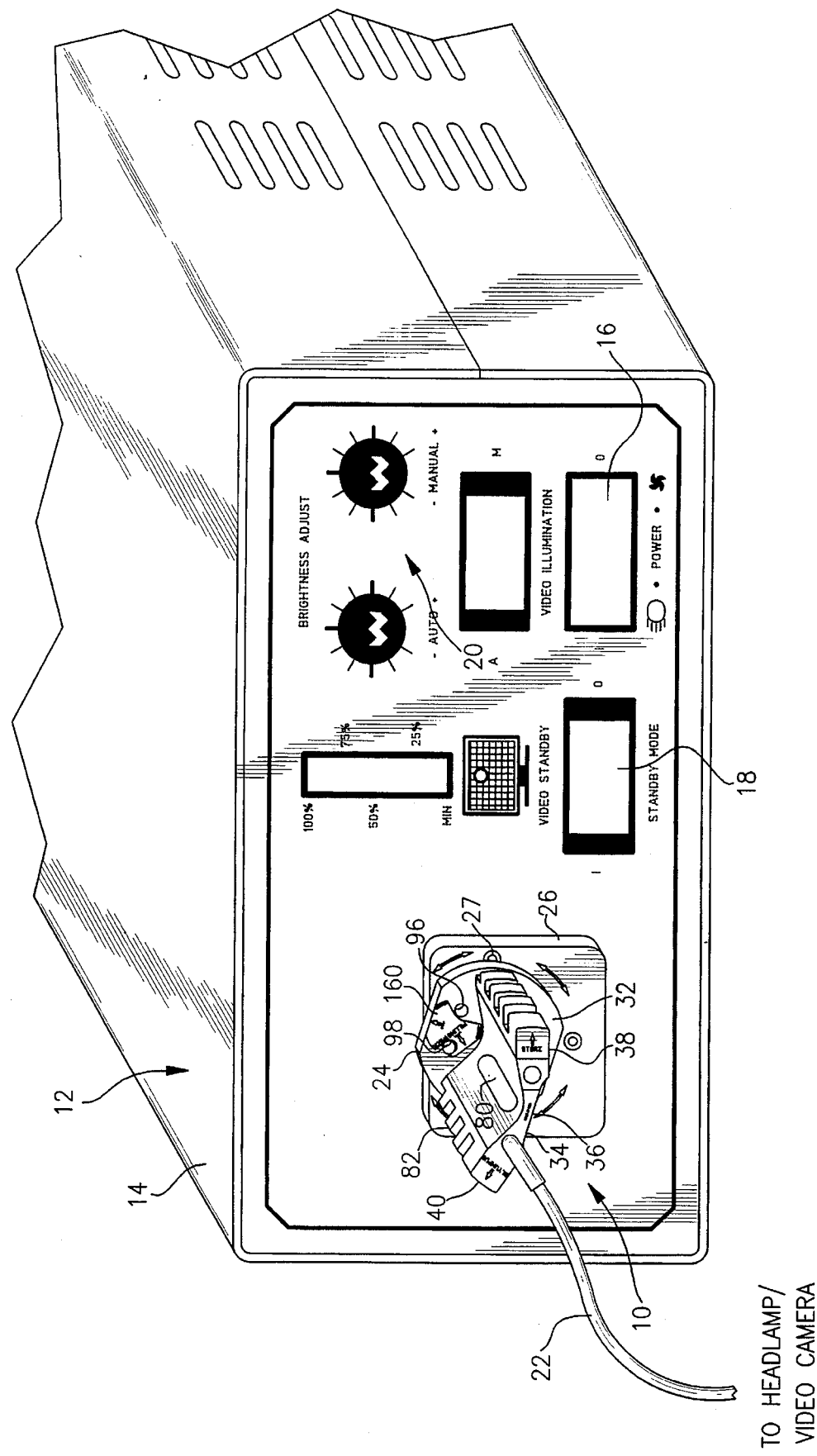
FIG. 1 is a perspective view of a fiberoptic illuminator including a preferred turret mechanism of this invention.

There is shown in FIG. 1 a multiple port turret mechanism 10 that is incorporated into a xenon fiberoptic illuminator 12. The illuminator includes a xenon light source, not shown, that is housed by an enclosure 14. Alternative fiberoptic light sources that are known to those skilled in the art may also be employed. Illuminator 12 may include various power and standby switches 16 and 18, respectively, as well as brightness adjusting dials 20. These features, as well as other adjustments that are not shown are mounted to enclosure 14 and used in a conventional manner to operate illuminator 12. Apart from turret mechanism 10, the details of the illuminator's construction and operation are well known and do not constitute a part of this invention. Illuminator 12 operates to generate light that is transmitted through turret mechanism 10 to a selected fiberoptic cable 22. The cable transmits the light to a required surgical or medical application. When a xenon light is utilized, the application may comprise a video camera, such as is used in endoscopy and laparascopy. When a halogen light source is employed, the light is typically directed, to a surgical headlamp in the manner described more fully below.

Figure 2:
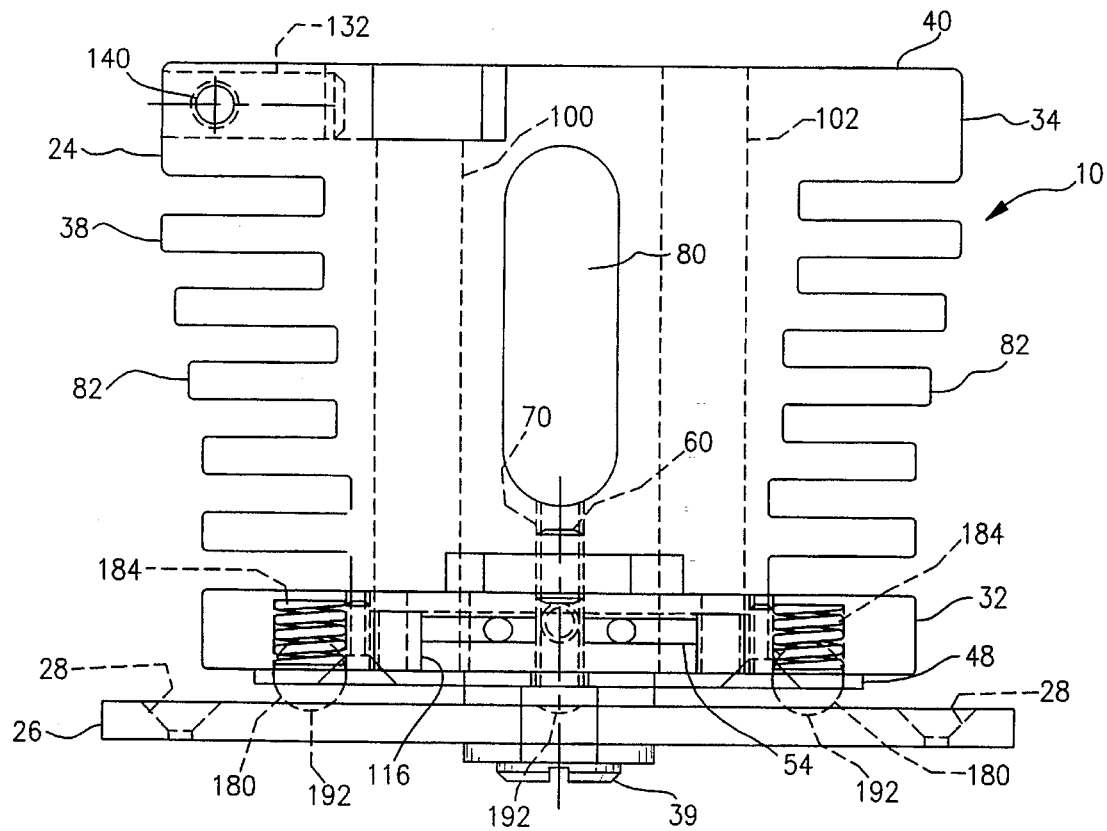
FIG. 2 is an elevational side view of the turret mechanism.
Figure 3:
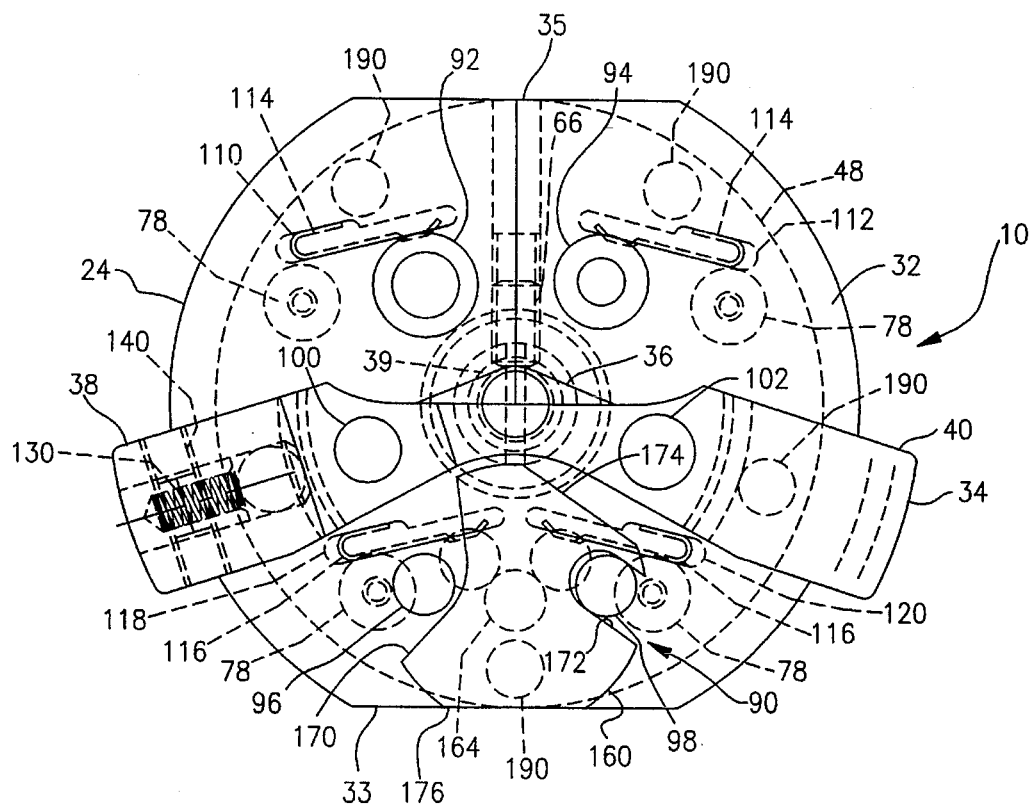
FIG. 3 is an elevational, axial end view of the turret mechanism.
Figure 4:
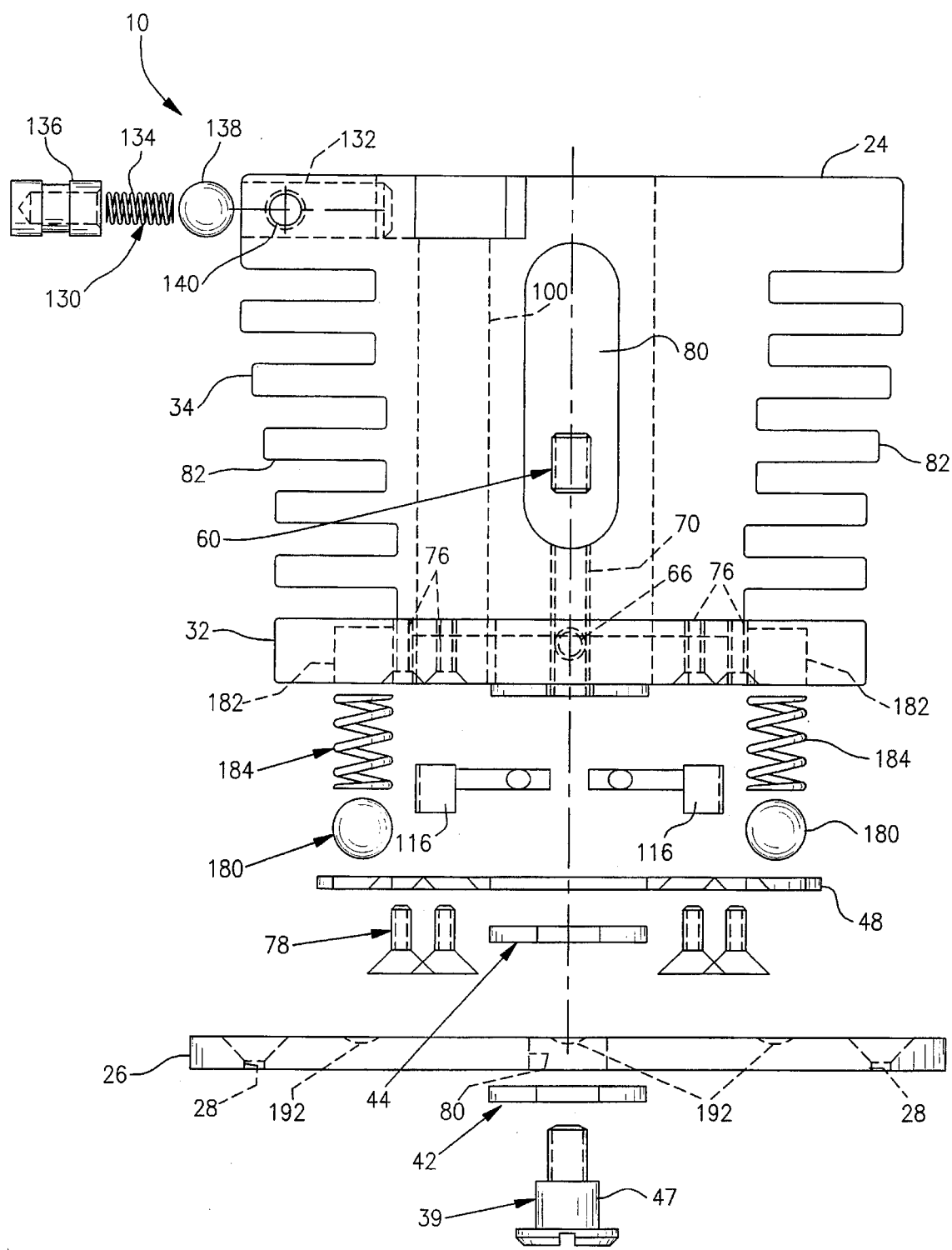
FIG. 4 is an exploded view of the turret mechanism.
Figure 5:
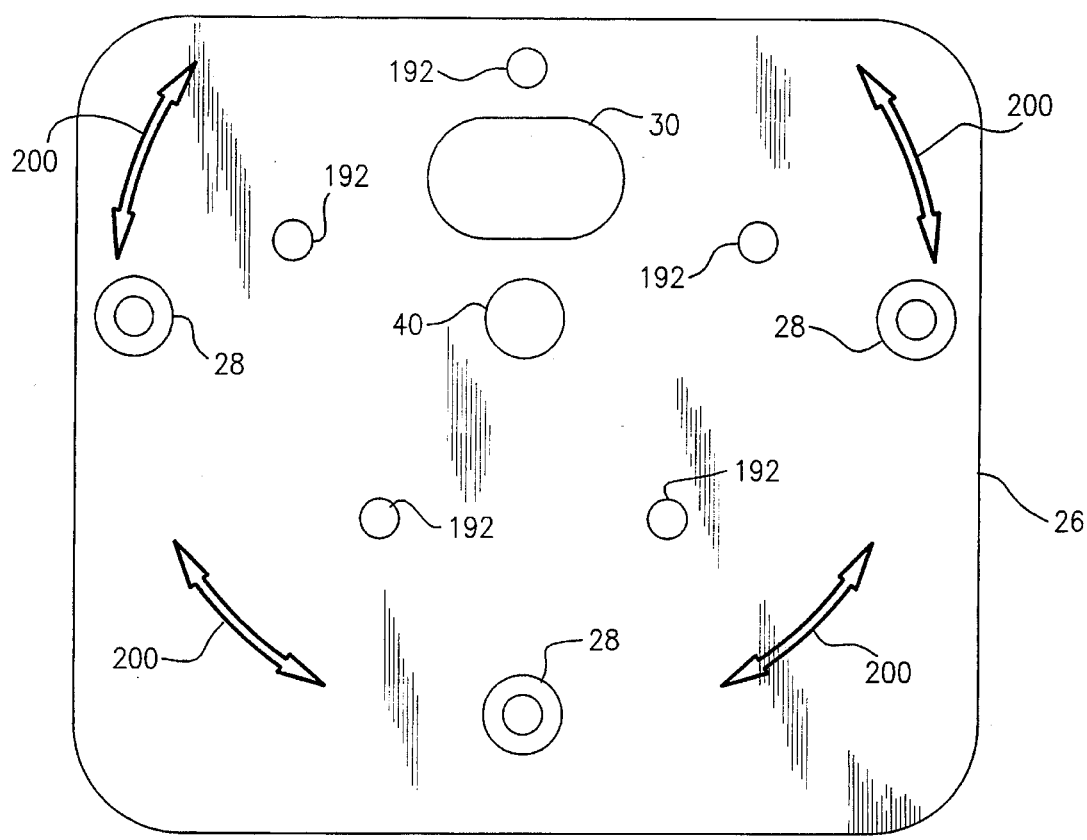
FIG. 5 is a plan view of the plate element, which mounts the turret mechanism to a xenon illuminator enclosure.

Turret mechanism 10, which is shown alone in FIGS. 2–4, includes a turret body 24 that is rotatably supported on a mounting plate 26. The mounting plate, shown alone in FIG. 5, comprises a generally flat piece of aluminum that is positioned over an opening in enclosure 12. Plate 26 is secured to the enclosure by three machine screws 27, FIG. 1, fastened through respective openings 28 in plate 26. (See FIGS. 2, 4 and 5). As best shown in FIG. 5, plate 26 includes an aperture 30 that communicates with the opening, of the enclosure 14 for projecting light out of the enclosure.

As indicated in FIGS. 1–4, turret body 24 includes a disk-shaped base portion 32 and an elongate tower portion 34 that is attached unitarily to and extends upwardly from base portion 32. As with plate element 26, turret body 24 is composed of aluminum. The circumferential surface of base portion 32 includes a pair of flat sections 33 and 35. As best illustrated in FIGS. 1 and 3, tower portion 34 includes a central segment 36 and a pair of relatively wide arm segments 38 and 40 extend generally radially at an angle to one another. Section 36 includes a longitudinal slot 80, FIGS. 2 and 4. Each of the arm segments 38 and 40 is provided with a plurality of heat dissipating, fins 82 that are arranged in a vertically parallel manner along the length of each arm segment of the tower portion.

Turret body 24 is rotatably mounted to plate element 26 and thereby to enclosure 14. Threaded axial pin 39, FIGS. 2–4, is engaged with a hole 40, FIG. 5, in plate element 26 and is attached to turret body 24. Specifically, pin 39 extends through a central opening, 80 (FIG. 6A) in a ball retaining, plate 48 and engages a threaded axial channel 70 (FIGS. 2 and 4) in turret body 24. A vertical set screw 60 and a horizontal set screw 66 help to fix pin 39 to turret body 24. An annular washer 42 end, ages pin 39 between the head of the pin and plate 26. A similar washer 44 engages pin 39 between plates 26 and 48. A smooth portion 47 of pin 39 extends through plate 26 so that the pin and attached turret rotate relative to the plate and housing 14.

Figure 6A:
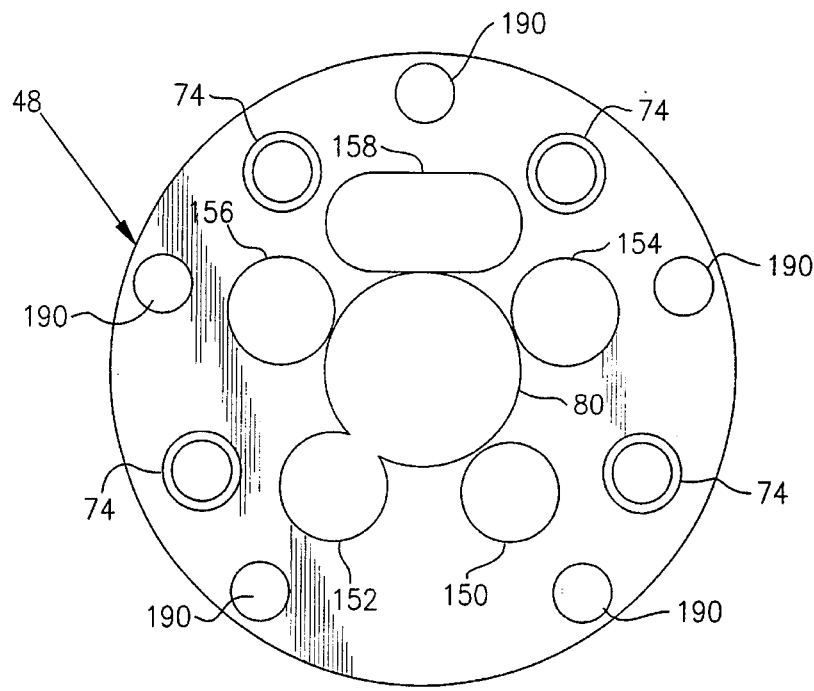
FIG. 6A is a top side view of an intermediate ball retaining plate used in the turret mechanism.
Figure 6B:
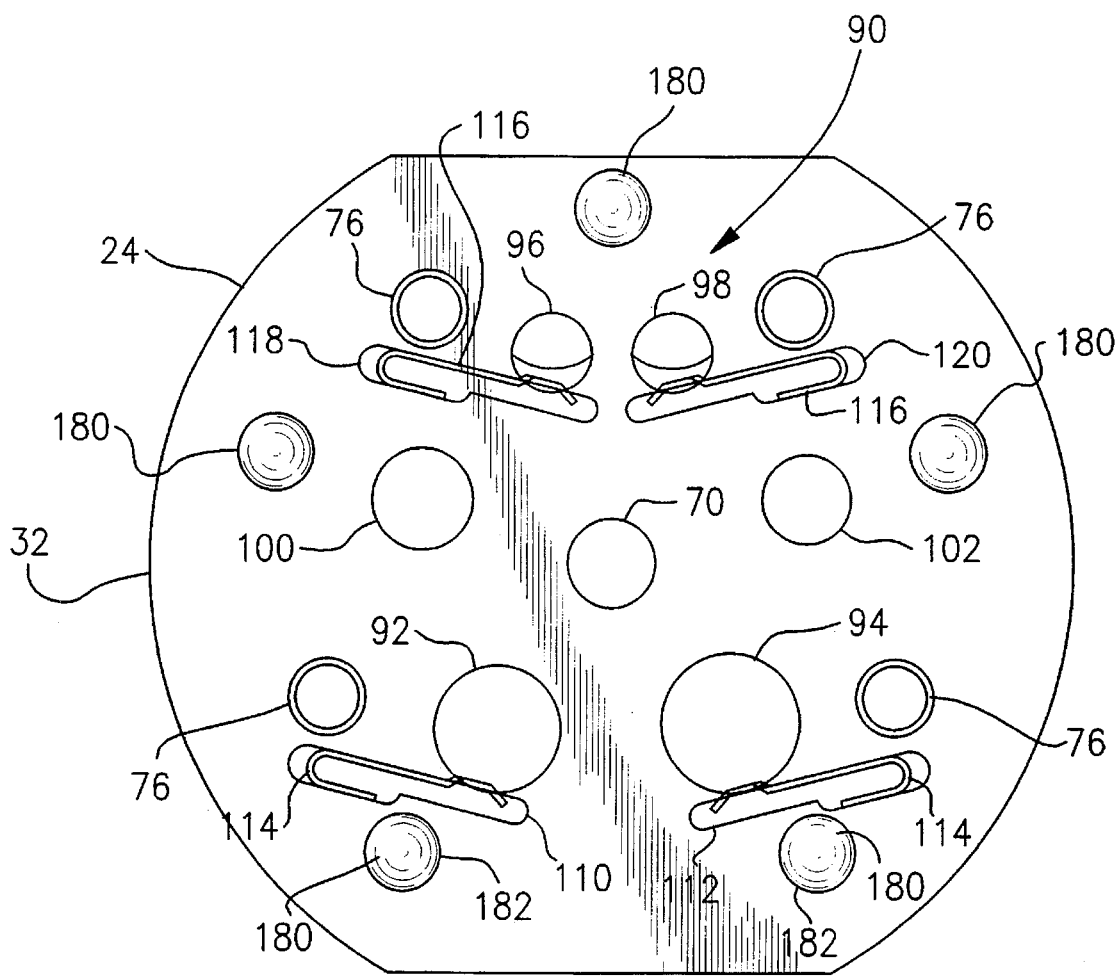
FIG. 6B is a bottom plan view of the turret body.

An intermediate plate 48, shown alone in FIG. 6A, is formed between plate 26 and the bottom of turret base portion 32, shown alone in FIG. 6B. Plate 48 includes four screw holes 74 that align with respective openings 76, FIGS. 4 and 6B, formed in the bottom of turret body 24. The aligned openings 74 and 76 receive respective flat headed screws 78 that secure plate 48 to the bottom of turret body 24. As stated, central opening 80 in plate 48 receives the mounting pin 39. A number of additional openings formed on plate 48 are used to project light through the turret and for the indexing function. These operations are explained more fully below.

Base portion 32 of turret body 24 includes a first group of fiberoptic cable engaging ports formed therethrough. Similarly, a second group of fiberoptic cable engaging ports extend longitudinally through the arm segments of tower portion 34. More particularly, as shown in FIGS. 3 and 6B, a primary port 90 and additional ports 92 and 94 are formed completely through base portion 32. Ports 92 and 94 comprise conventional stepped, cylindrical openings that are formed generally vertically through the base portion. Primary port 90 comprises a pair of generally cylindrical receptacles 96 and 98 that extend through base portion 32 on the side of tower portion 34 opposite from ports 92 and 94. Unlike the vertically arranged ports 92 and 94, receptacles 96 and 98 are each formed at a downwardly converging slant or angle through base portion 32. As best shown in FIGS. 2, 3, and 6B tower portion 34 includes a port 100 formed longitudinally through arm segment 38 and an additional port 102 formed longitudinally through arm segment 40.

Each of the ports is shaped or configured in a known manner such that it operably receives the standard end fitting of a corresponding brand of fiberoptic cable. In a preferred example, port 92 receives a Wolf™ fitting, port 94 engages ACMI™ fitting, port 100 is attached to a Storz™ cable and port 102 engages an Olympus™ fitting. Receptacles 96 and 98 are designed particularly to engage either the one or two plug end fittings of a PillingWeck™ fiberoptic cable. The respective end fittings, which are not shown herein, are attached to the respective ports in a conventional manner by inserting each end fitting into its respective port. The ports are labeled according to their corresponding brand of cable in the manner shown in FIGS. 8–13.

Various types of resilient bearing means are employed for improving interengagement between each port and its respective fiberoptic cable end fitting. Base portion 32 includes, on one side of tower portion 34, a pair of cavities 110 and 112, FIGS. 3 and 6B, that are communicably interconnected with ports 92 and 94, respectively. A spring clip 114 is mounted in each of cavities 110 and 112 such that it is biased into the associated port 92 and 94. When an end fitting is inserted into a particular port, the associated spring clip bears on and grips the end fitting so that the fitting resists unintentional disengagement from the port. Similar spring clips 116 (see also FIG. 4) are mounted in analogous cavities 118 and 120 formed adjacent respective receptacles 96 and 98 of port 90. This provides for improved gripping of end fitting plugs received in the receptacles.

Alternative resilient bearing means are associated with at least one of the ports in tower portion 34. In particular, a resilient bearing mechanism 130, FIGS. 3 and 4, is received in a chamber 132 that is formed in arm segment 38 of tower portion 34. Chamber 132 extends from the distal end of segment 34 and is communicably interconnected with port 100. Resilient bearing mechanism 130 includes a helical compression spring 134 and a spring retaining element 136. The inner end of spring 134 engages a spherical bearing 138. Mechanism 130 is introduced into chamber 132 such that spring 134 biases bearing 138 inwardly. A pair of set screws 140 hold spring retainer 136 securely in place in chamber 132. The opening through which chamber 132 communicates with port 100 is sufficiently small so that only a portion of the outer surface of bearing 138 is pushed into port 100. As a result, when a Storz™ fitting is inserted into port 100 bearing 138 engages the shoulder of the fitting and holds it securely in place. Unintentional disengagement of the Storz™ fitting is prevented.

Plate 48, FIG. 6A, includes a plurality of openings that correspond with the above described ports. In particular, circular openings 150, 152, 154 and 156 are aligned with single receptacle ports 92, 94, 100 and 102, respectively. Oblong opening 158 in plate 48 corresponds with the dual receptacles 96 and 98 of port 90.

Figure 7:
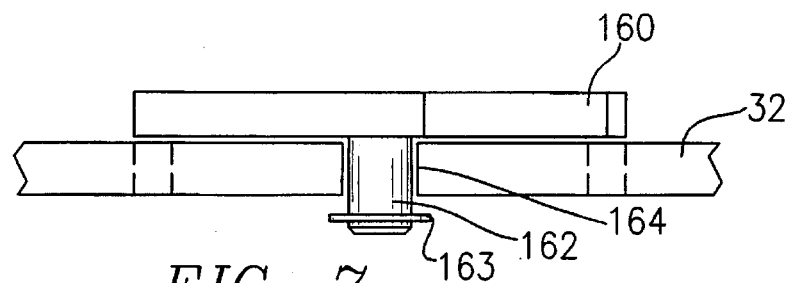
FIG. 7 is an elevational, cross sectional view of the closure for the primary port means.

As previously stated, primary port 90 is designed to engage with either the single plug end fitting or a double plug end fitting of a PillingWeck™ fiberoptic cable. As shown in FIG. 3, an adjustable closure 160 is mounted on base portion 32 and is pivotal thereon such that either one or two of the receptacles 96 and 98, as required, may be revealed. Closure 160, shown also in FIG. 7, comprises a generally flat plate mounted at one end of a spindle 162. The spindle is received in an opening 164 in base portion 32. An appropriate retaining ring 163 secures the closure and spindle to the base portion. Closure 160 includes a first recessed portion 170 and a second recessed portion 172. The closure also includes a pair of flat sides 174 and 176. Closure 160 is alternated between two positions wherein a flat side of the closure is arranged flush with flat surface 33 of base portion 32. The closure is configured such that in the first position one receptacle of port 90 is revealed and in the second position both receptacles are revealed. This operation is best illustrated in FIGS. 8 and 9. Therein, turret 10 is indexed, in the manner that will be described more fully below, such that port 90 is positioned in front of the light source aperture. (See aperture 30 in FIG. 5.) As shown in FIG. 8, when flat side 174 of closure 160 is aligned generally flush with flat surface 33 of base portion 32, recess 170 exposes receptacle 98. At the same time, the other receptacle 96 is covered by closure 160. In this state, a PillinSWeck™ end fitting having a single plug element is engaged with receptacle 98 and light is transmitted through the attached cable. Alternatively, as illustrated in FIG. 9, closure 160 may be rotated in the manner indicated by the double headed arrows 200 printed directly on the closure such that the second flat side 176 of closure 160 is aligned generally flush with flat surface 33 of base portion 32. This causes recess 172 to be aligned with receptacle 98 and recess 170 to be aligned with receptacle 96. Both receptacles of port means 90 are exposed and a dual plug PillingWeck™ end fitting may be engaged with the port. Specifically, each plug element is engaged with a respective receptacle. Both receptacles are thereby aligned with aperture 30 of plate element 26 and light from the illuminator is transmitted through the attached fiberoptic cable. As illustrated in FIGS. 8 and 9, the numeric designations "1" and "2" and accompanying arrows are directed toward sides 174 and 176, respectively, to clearly indicate the correct closure positioning required to expose either one or two receptacles. As a result, the operator can quickly and conveniently adjust closure 172 to expose the proper number of receptacles.

Indexing means control rotation of turret body 24 and hold a selected one of the port means 90, 92, 94, 100 and 102 in position in front of the illuminator aperture. As indicated in FIGS. 2, 4, and 6B the indexing means include five spherical bearings 180. Each bearing 180 is received in a respective compartment 182 formed in the bottom surface of turret base 32. A spring 184 extends between the inside wall of each compartment 182 and the spherical bearing 180 and urges the bearing downwardly against ball retaining plate 48. Plate 48 includes a plurality of circular holes 190, FIG. 6A, that correspond with the bearings 180. Each opening 190 has a diameter that permits a portion of the outer surface of its respective bearing 180 to extend through plate 48. The indexing means further includes five bearing recesses 192 formed in plate 26, as shown in FIGS. 2, 4 and 5 and arranged to conform to the pattern exhibited by bearing, 180. As a result, turret body 24 can be rotated so that each recess 192 receives a respective spring biased bearing 180. This holds turret body 24 in a temporarily locked position against plate section 26. The recesses 192 are positioned in plate 26 such that when they are lockably engaged by the ball bearings, one of the ports of the turret is held in front of the illuminator aperture and corresponding standard end fitting may be engaged with that port. In order to utilize a different end fitting 200, the turret body 24 is rotated in either direction, as indicated by the double headed arrows in FIGS. 5 and 8–13. The operator grasps the turret body and exerts sufficient force such that the bearings 180 are urged out of their respective recesses 192. As the turret body is turned, each bearing, continues to be biased by its respective spring 184 such that the bearing rolls over the outside face of plate 26 until it reaches the next recess 192. At that point, each of the bearings 180 is more or less simultaneously pushed into a new recess 192 and the turret body is temporarily held in a new locked position with a different port located in front of the illuminator aperture. Using this construction the turret is indexed smoothly, quickly and conveniently, without undue exertion, by applying a constant torque. The mechanism exhibits improved positive indexing and the turret is held securely in place with a selected port in front of the illuminator aperture.

The various indexed turret positions are shown in FIGS. 8–13. As previously indicated, each port is labeled according to the end fitting, which corresponds to it. Additionally, an arrow is provided above each trade name. To position a particular port in front of the illuminator aperture, the turret body is rotated until the trade name associated with the desired port is at the twelve o'clock position and the arrow associated with that trade name is similarly, pointed in that direction. FIGS. 8 and 9, described above, depict port means 90 being held in front of the aperture and respectively revealing one and two plus receptacles. To rotate turret body 24 from the position shown in FIGS. 8 and 9 to the position shown in FIG. 10, the operator grasps flat surfaces 33 and 35 of turret body 24 and urges the turret body to rotate in a clockwise direction until port 102 is positioned in front of the illuminator aperture. The designation "Olympus" and its associated arrow pointing toward twelve o'clock quickly and reliably advise the operator that the Olympus™ fitting can now be used with the illuminator. FIGS. 11, 12 and 13 illustrate ports 94, 92 and 100 in position in front of the illuminator aperture so that the ACMI™, Wolfe™ and Storz™ fiberoptic cables, respectively, may be operably engagaed with the illuminator. In each position the bearings 180 pair with different respective recesses 192 so that the turret is held securely in place until the use of a different port is required. As illustrated by arrows 200 in FIGS. 8–9, the turret body 24 may be rotated in either direction and through any number of positions to properly locate the desired port in front of the illuminator aperture. The easy-to-grasp turret body facilitates turning, and the heat dissipating fins cool the turret body so that the operator may properly position the turret without burning, his or her fingers.

A dual turret mechanism, according to this invention, is illustrated in FIG. 14. This mechanism is particularly useful for halogen fiberoptic illuminators. In this embodiment, a pair of turret bodies 10a are mounted for indexed rotation on a plate 26a, shown alone in FIG. 15. Plate 26a includes a pair of oblong apertures 30a that project light from a halogen light source in a manner analogous to that previously described. Plate 26a is secured to a halogen illuminator housing by engaging appropriate screws with respective opening 28a. Plate 26a also includes a pair of mounting holes 40a for rotatably mounting turrets 10a in a manner similar to that previously described.

Each of the turret bodies 10a is constructed and operated analogously to the turret body in the previously described embodiment. In particular, each includes a base portion 32a, a tower portion 34a and a plurality of fiberoptic interengaging ports disposed therethrough. The resilient bearing indexing means utilized in the previous embodiment are also employed in the halogen illuminator version. As shown in FIG. 15, plate 26a is provided with two sets of recesses 192a and 192aa, which set the positions at which the respective turrets may be locked. The most significant difference in the structure of this embodiment is that the apertures 30a are formed respectively at the 3 o'clock and 9 o'clock positions. In order to align a desired port with an aperture 30a the turret body is rotated, as previously described, until the positioning arrow associated with that port is pointed in the 3 o'clock or 9 o'clock position, as applicable. At this point, the indexing means should interengage to hold the port in that position. The end fitting of the associated standard fiberoptic cable can then be engaged with the port positioned in front of an aperture 10a so that light can be transmitted through the cable.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. In a fiberoptic illuminator including a light source and means defining a housing that encloses the light source and has an aperture for projecting light therefrom, the improvement which includes a multiple port turret mechanism for operably interconnecting the illuminator and a selected one of a like multiple of standard fiberoptic cables, each said cable having a respective end fitting that is distinct from the end fitting of each other said cable, said turret mechanism comprising:

a turret body including a base portion having a first group of at least three port means formed therethrough, each said port means in said first group being adapted for selective and operable interengagement with the end fitting of a corresponding one of the fiberoptic cables, and an elongate tower portion attached to and extending upwardly from said base portion and having a second group of at least two port means formed longitudinally through said tower portion, each port means of said second group being adapted for selective and operable interengagement with the end fitting of corresponding one of the fiberoptic cables;

means for rotatably mounting said turret body to the housing such that said port means are permitted to pass individually in front of the aperture; and index means for controlling rotation of said body and holding a selected one of said port means in position in front of the aperture such that light from the illuminator is directed through a corresponding fiberoptic cable engaged with said selected port means.

2. The mechanism of claim 1 in which said tower portion includes a plurality of generally parallel cooling fins.

3. The mechanism of claim 1 in which said port means are arranged at different angular orientations about said turret body.

4. The mechanism of claim 1 further including resilient bearing means carried by said turret body for bearing against an end fitting engaged with a corresponding said port means such that said engaged end fitting resists disengagement from said corresponding port means.

5. The mechanism of claim 4 in which said resilient bearing means include spring means received in a groove in said tower portion adjacent to one of said port means in said second group and bearing means biased by said spring means into interengagement with a corresponding end fitting engaged with said adjacent port means.

6. The mechanism of claim 4 in which said resilient bearing means include a spring clip mounted in said base portion and extending into said corresponding port means in said first group for engaging and holding an end fitting that is engaged with said corresponding port means.

7. The mechanism of claim 1 in which said means for indexing include bearing means carried by said turret body, indexing spring means that bias said bearing remains against said housing, and a plurality of position defining holes formed at predetermined locations in said housing and being selectively engaged by said bearing means to hold said selected port means in position in front of said aperture as said body is rotated.

8. The mechanism of claim 7 in which said bearing means include five spherical bearings, each carried by a respective recess in said turret body, said indexing spring means include five spring elements, each associated with a respective bearing and in which five position defining holes are formed in said housing, each receiving a selected respective bearing to hold said turret body in position.

9. In a fiberoptic illuminator including a light source and means defining a housing that encloses the light source and has an aperture for projecting light therefrom, the improvement which includes a multiple port turret mechanism for operably interconnecting the illuminator and a selected one of a like number of standard fiberoptic cables, each said cable having a respective end fitting that is different from the end fitting of each other said cable, one of said standard cables including one of a first end fitting that has a single plug element and a second end fitting that has two plug elements, said mechanism comprising:

a turret body having a plurality of distinctly shaped port means formed therethrough, each said port means in said port means being adapted for selective and operable interengagement with an end fitting of a corresponding one of the fiberoptic cables, said port means further including, a primary port means that has a first receptacle for selectively receiving the plug element of the said first end fitting and one of the plug elements of the second end fitting and a second receptacle for receiving the other plug element of the second end fittings to operably interengage a selected one of the end first and second end and a corresponding fiberoptic cable with said primary port means;

means for rotatably mounting said turret body to said housing such that said port means are permitted to pass individually in from of the aperture; and index means for controlling rotation of said body and holding a selected one of said port means in position in from the aperture such that light from the illuminator is directed through a corresponding fiberoptic cable engaged with said selected port means.

10. The mechanism of claim 9 in which said turret body includes a base portion having a first group of port means that include said primary port means, and a tower portion extending upwardly from said base portion and having a second group of port means.

11. The mechanism of claim 10 in which said first and second receptacles extend generally downwardly through said base portion at a converging angle.

12. The mechanism of claim 9 further including a closure member movably mounted to said body portion and alternated between a first portion wherein said closure member covers said second receptacle and exposes said first receptacle for interengagement with said plug element of said first end fitting and a second potion wherein said closure member exposes both said first and second receptacles for respective interengagement with said plug elements of said second end fitting.

13. The mechanism of claim 10 in which said first group of port means include three port means formed in said base portion, each being respectively engaged by the respective end fitting of a corresponding one of the fiberoptic cables and said second group of port means include a pair of port means formed in said tower portion, each being respectively engaged by the end fitting of a corresponding one of the fiberoptic cables.

14. The mechanism of claim 9 further including resilient means carried by said turret body for bearing against an end fitting engaged with a corresponding said port means such that said engaged end fitting resists disengagement from said corresponding port means.

15. The mechanism of claim 14 in which said resilient bearing means include spring means received in a groove in said tower portion adjacent to one of said port means in said second group and bearing means biased by said spring means into interengagement with the corresponding end fitting engaged with said adjacent port means.

16. The mechanism of claim 14 in which said resilient bearing means include a spring clip mounted in said base portion and extending into said corresponding port means in said first group for engaging and holding an end fitting that is engaged with said corresponding port means.

17. A multiple port turret mechanism for operably interconnecting a fiberoptic illuminator, which illuminator includes a light source, and a selected one of a like multiple of standard fiberoptic cables, each said cable having a respective end fitting that is distinct from the end fitting of each other cable, said mechanism comprising:

a plate element mounted to said housing and including means defining an aperture for projecting light from the light source;

a turret body including a base portion having a first group of at least three port means formed therethrough, each said port means in said first group being adapted for selective and operable interengagement with the end fitting of a corresponding one of the fiberoptic cables, and an elongate tower portion attached to and extending upwardly from said base portion and having a second group of at least two port means formed longitudinally through said tower portion, each port means of said second group being adapted for selective and operable interengagement with the end fitting of corresponding one of the fiberoptic cables;

means for rotatably mounting said turret body to said plate element such that said port means are permitted to pass individually in front of said aperture; and index means for controlling rotation of said turret body and holding a selected one of said port means in position in front of the aperture such that light from the illuminator is directed through a corresponding fiberoptic cable engaged with said selected port means.

18. The mechanism of claim 17 in which said index means include bearing means carried by said turret body, indexing spring means that bias said bearing remains against said plate, and a plurality of position defining holes formed at predetermined locations in said plate and being selectively engaged by said bearing means to hold said selected port means in position in front of said aperture as said body is rotated.

19. The mechanism of claim 17 in which said bearing means include five spherical bearings, each carried by a respective recess in said turret body, said indexing spring means include five spring elements, each associated with a respective bearing and in which five position defining holes are formed in said housing, each receiving a selected respective bearing to hold said turret body in position.

20. In a fiberoptic illuminator including a light source and means defining a housing that encloses the light source and has an aperture for projecting light therefrom, the improvement which includes a multiple port turret mechanism for operably interconnecting the illuminator and a selected one of a like multiple of standard fiberoptic cables, each said cable having a respective end fitting that is different from the end fitting of each other said cable, said mechanism comprising:

a turret body having a plurality of distinctly shaped port means formed therethrough, each said port means being adapted for selective and operable interengagement with the end fitting of a corresponding one of the fiberoptic cables;

resilient bearing means carried by said turret body for bearing against an end fitting engaged with a corresponding said port means such that said engaged end fitting resists disengagement from said corresponding port means, said resilient bearing means including a compression spring received in a groove in said turret body adjacent to one of said port means and a spherical bearing biased by said compression spring into interengagement with a corresponding end fitting engaged with said adjacent port means;

means for rotatably mounting said turret body to said housing such that said port means are permitted to pass individually in front of the aperture; and index means for controlling rotation of said body and holding a selected one of said port means in position in front the aperture such that light from the illuminator is directed through a corresponding fiberoptic cable engaged with said selected port means.

\* \* \* \* \*

UNITED STATES PATENT AND TRADEMARK OFFICE
CERTIFICATE OF CORRECTION

PATENT NO. : 5,617,302
DATED : April 1, 1997
INVENTOR(S) : Jacobus F. Kloots

It is certified that error appears in the above-identified patent and that said Letters Patent is hereby corrected as shown below:

Column 4, line 9, after "directed" delete ",";

Column 4, line 43, change "end, ages" to -- engages --;

In the claims:

Claim 9, lines 34-35, delete "in said port means";

Claim 9, line 38, after "further including" delete the ",";

Claim 9, line 40, before "said first end" delete "the";

Claim 9, line 43, change "fittings" to -- fitting --;

Claim 9, line 44, before "first" delete "end" and after "second end" insert -- fittings --

Claim 9, line 49, change "from" to -- front --;

UNITED STATES PATENT AND TRADEMARK OFFICE
CERTIFICATE OF CORRECTION

PATENT NO. : 5,617,302
DATED : April 1, 1997
INVENTOR(S) : Jacobus F. Kloots

It is certified that error appears in the above-identified patent and that said Letters Patent is hereby corrected as shown below:

Claim 9, line 52, change first "from" to --front of--

Signed and Sealed this

Tenth Day of August, 1999

Q. TODD DICKINSON

Attest:

Attesting Officer

Acting Commissioner of Patents and Trademarks